United States Patent [19]

Benson

[11] Patent Number: 4,642,988
[45] Date of Patent: Feb. 17, 1987

[54] SOLAR POWERED FREE-PISTON STIRLING ENGINE

[75] Inventor: Glendon M. Benson, Danville, Calif.

[73] Assignee: New Process Industries, Inc., Minneapolis, Minn.

[21] Appl. No.: 518,607

[22] Filed: Jul. 29, 1983

Related U.S. Application Data

[63] Continuation-in-part of Ser. No. 292,771, Aug. 14, 1981, abandoned.

[51] Int. Cl.$^4$ .......................... F03G 7/02; F02G 1/04
[52] U.S. Cl. .................................. 60/641.14; 60/518; 60/520; 60/525; 60/526; 60/641.15; 60/659; 60/676; 62/6
[58] Field of Search ................. 60/517, 518, 520, 525, 60/526, 641.8, 641.14, 641.15, 659, 676, 669, 690; 62/6

[56] References Cited

U.S. PATENT DOCUMENTS

| | | | |
|---|---|---|---|
| 3,868,823 | 3/1975 | Russell, Jr. et al. | 60/641.15 |
| 4,044,558 | 8/1977 | Benson | 60/520 |
| 4,058,382 | 11/1977 | Mulder | 62/6 |
| 4,135,367 | 1/1979 | Frosch et al. | 60/641.15 |
| 4,271,669 | 6/1981 | Keller et al. | 60/517 |
| 4,408,456 | 10/1983 | Rauch | 60/518 |

OTHER PUBLICATIONS

Benson et al., "An Advanced 15KW Solar Powered Free Piston Stirling Engine", 15th Intersociety Energy Conversion Engineering Conference, Article Nos. 809,414, Aug. 18–22, 1980.

Primary Examiner—Stephen F. Husar
Attorney, Agent, or Firm—Townsend and Townsend

[57] ABSTRACT

A Stirling engine design which is solar powered is disclosed. A solar receiver converts solar radiation to thermal energy, which is stored in a storage chamber. The engine includes a displacer chamber with a displacer piston which divides the chamber into hot and cold subchambers, the hot subchamber being heated by the storage chamber. A mechanism is provided for cooling the cold subchamber. The engine also includes an alternator chamber with an alternator piston which divides the chamber into working and bounce subchambers, the working subchamber being in fluid communication with the cold subchamber of the displacer. The working fluid circulates through the cold subchamber and the working subchamber and obtains heat from the storage chamber. The working fluid is displaced by the displacer piston to drive the alternator piston, and work output is obtained from the alternator piston.

87 Claims, 17 Drawing Figures

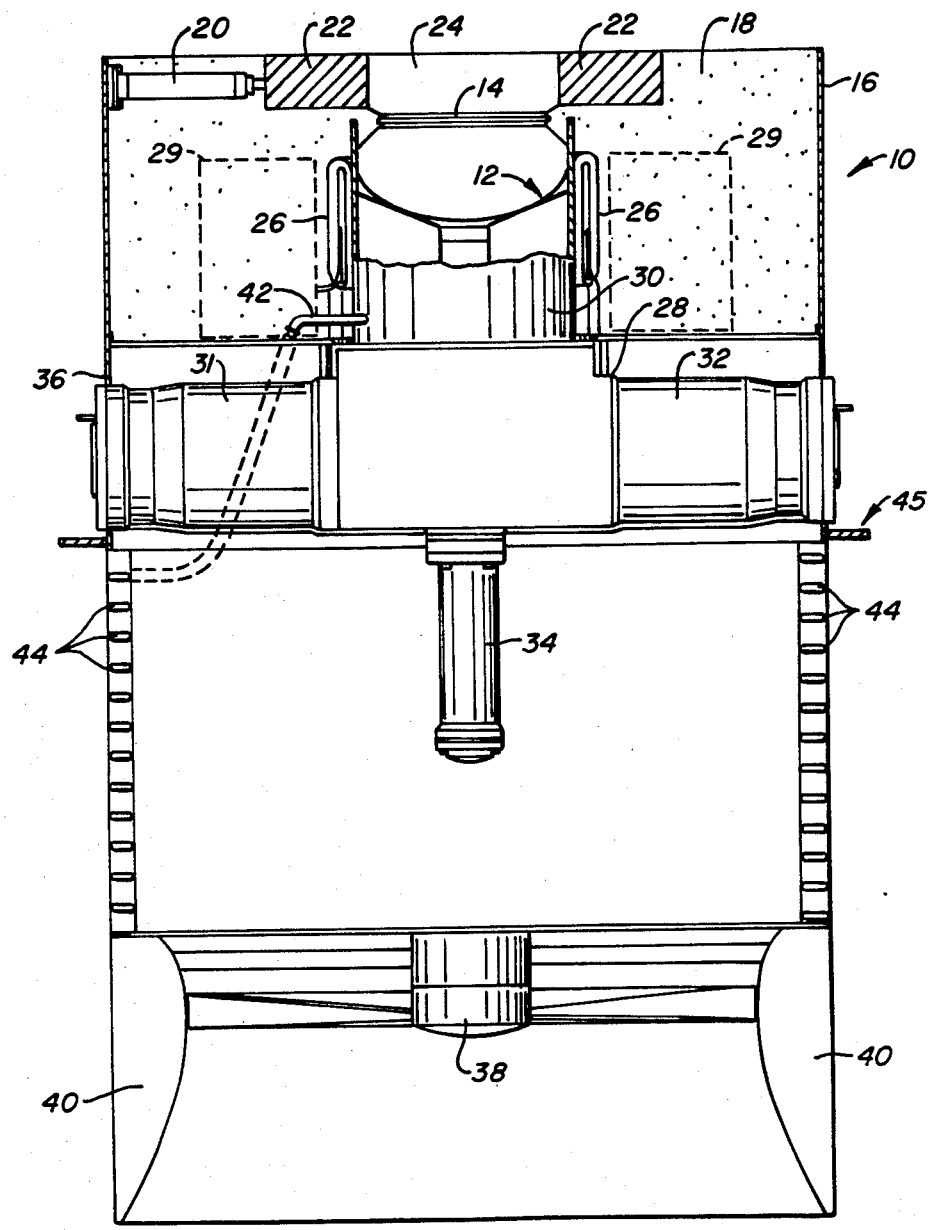
FIG._1.

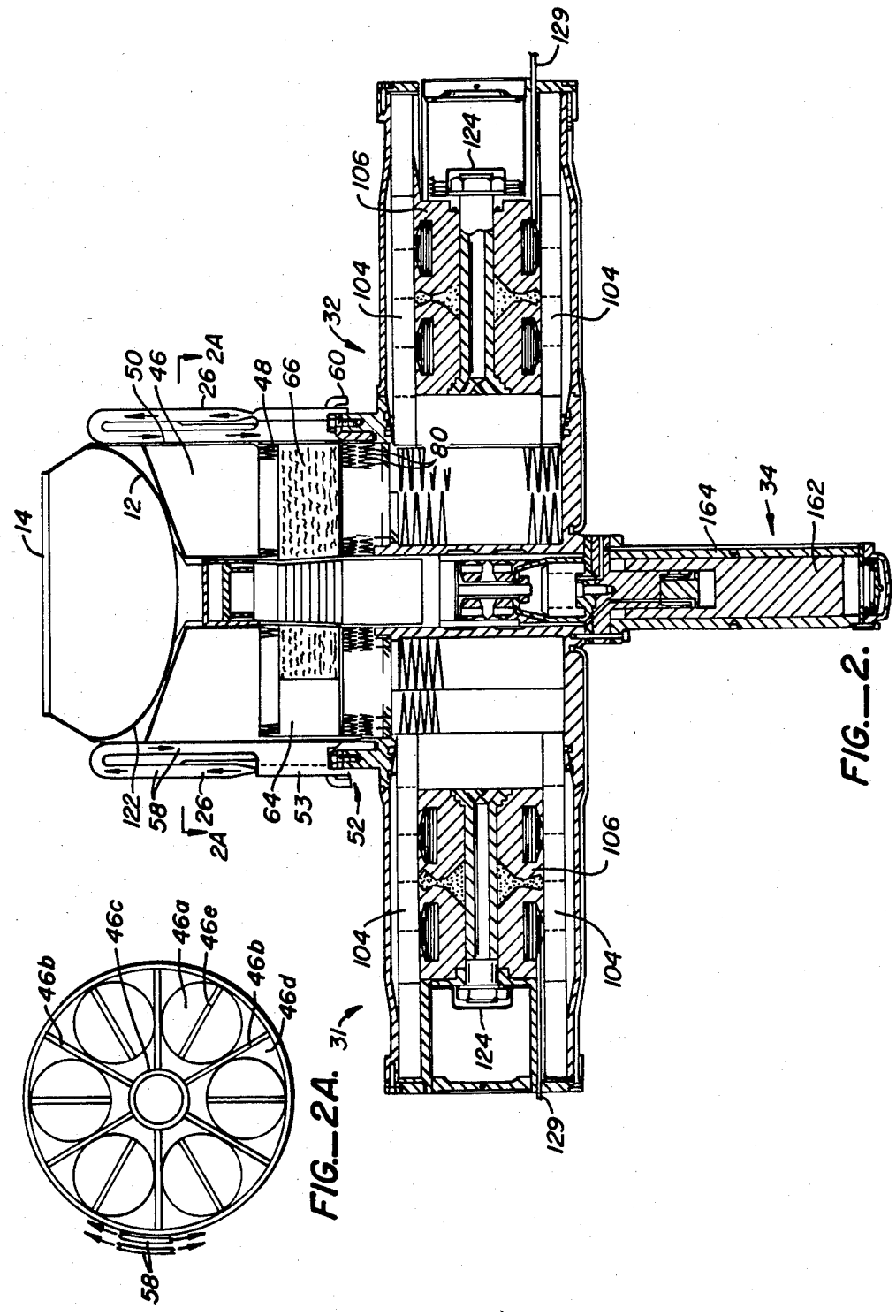

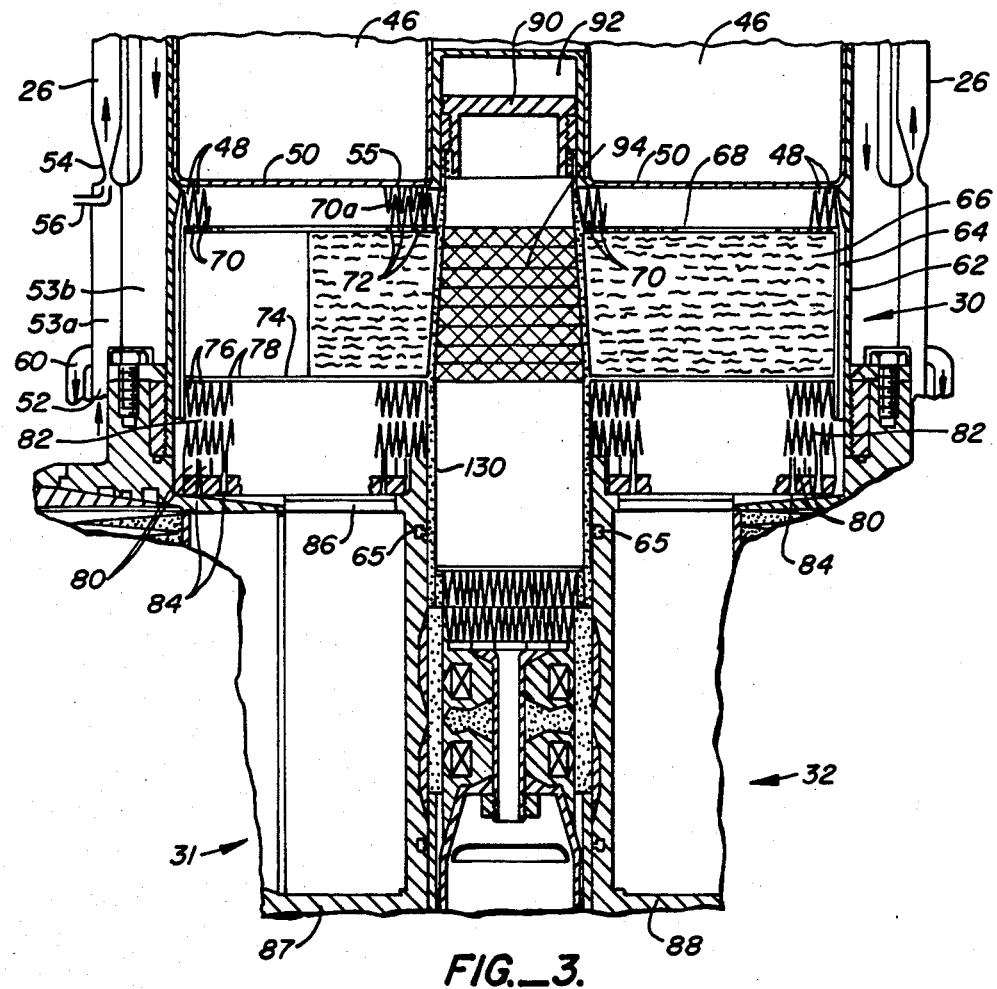
FIG._3.
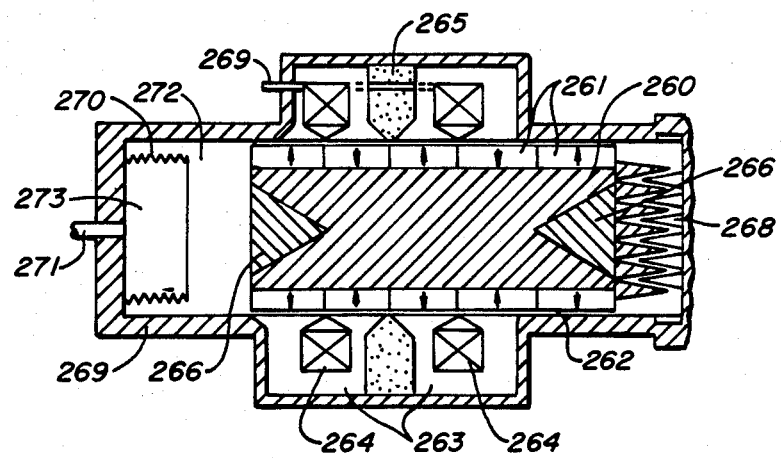
FIG._7.

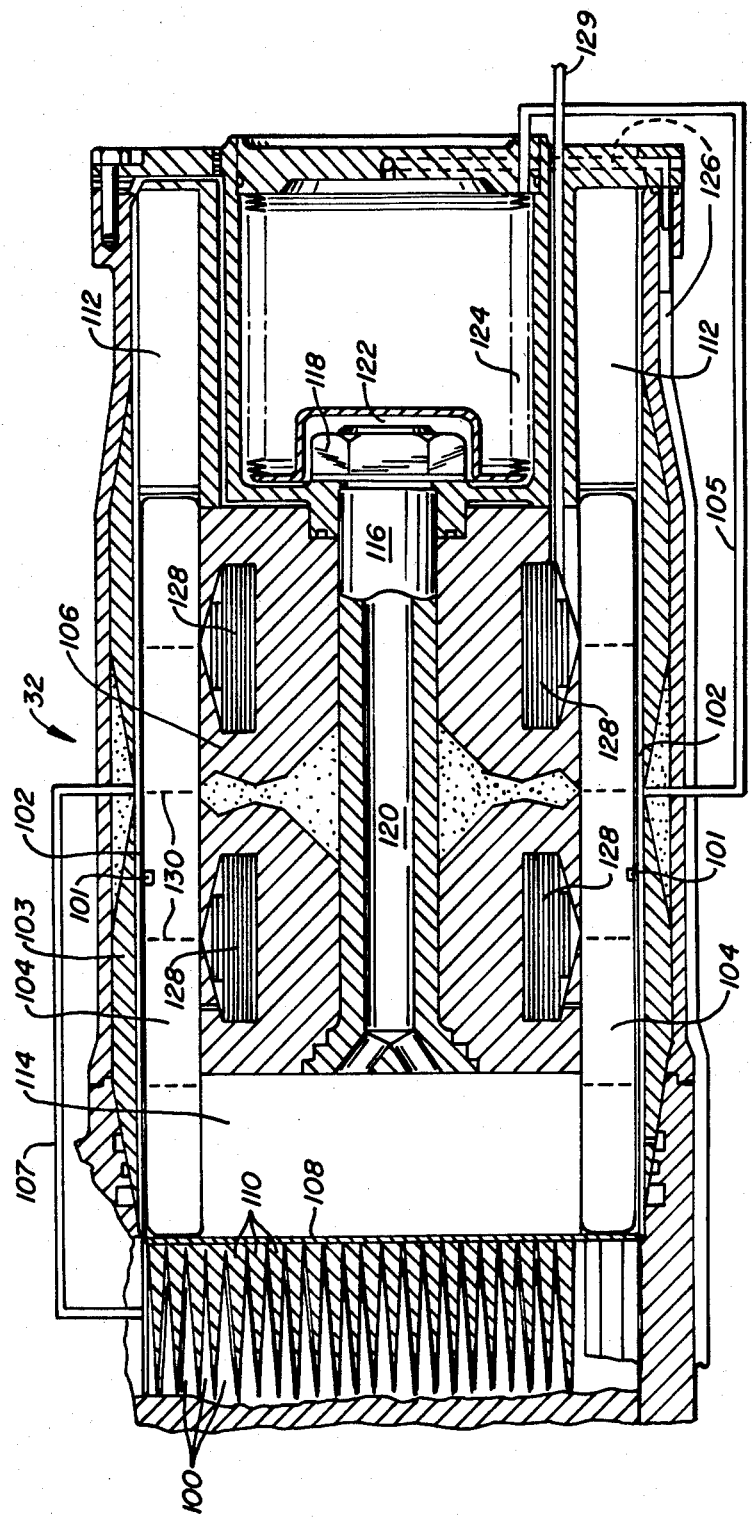

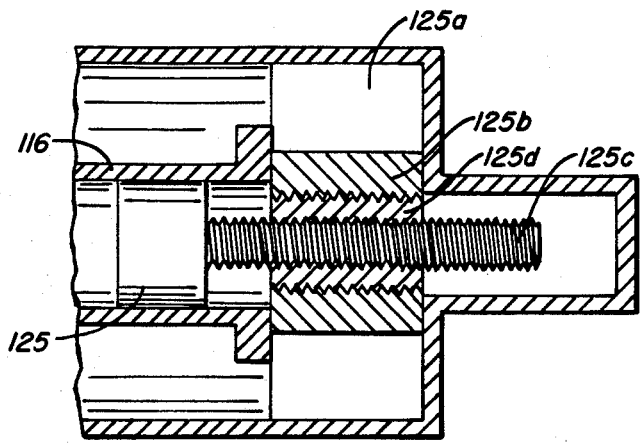
FIG._4A.
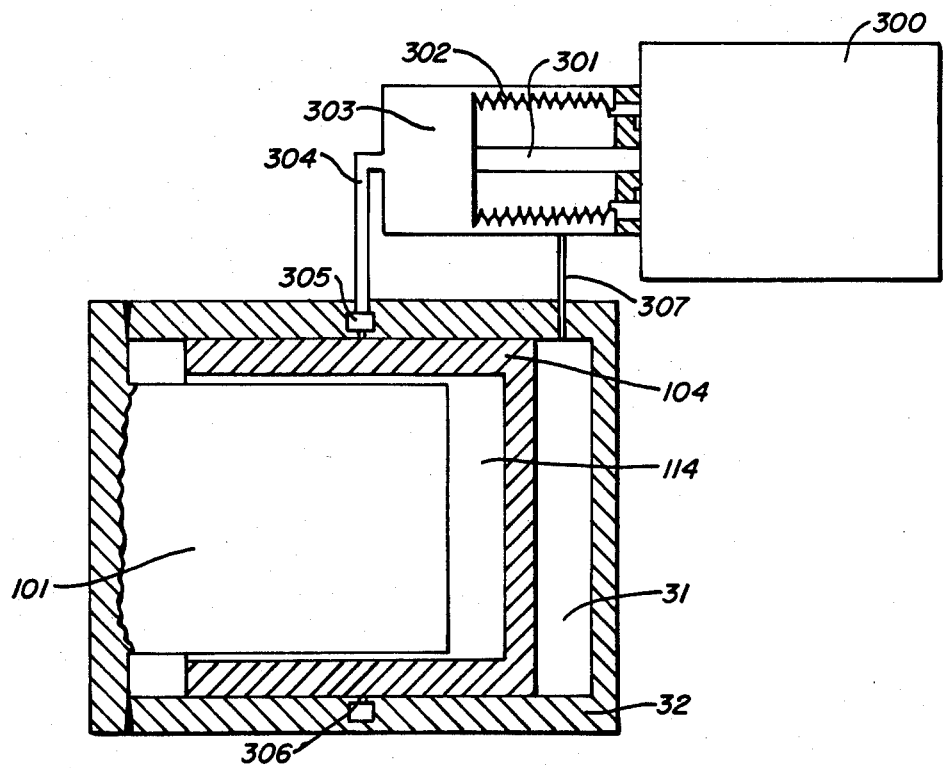
FIG._14.

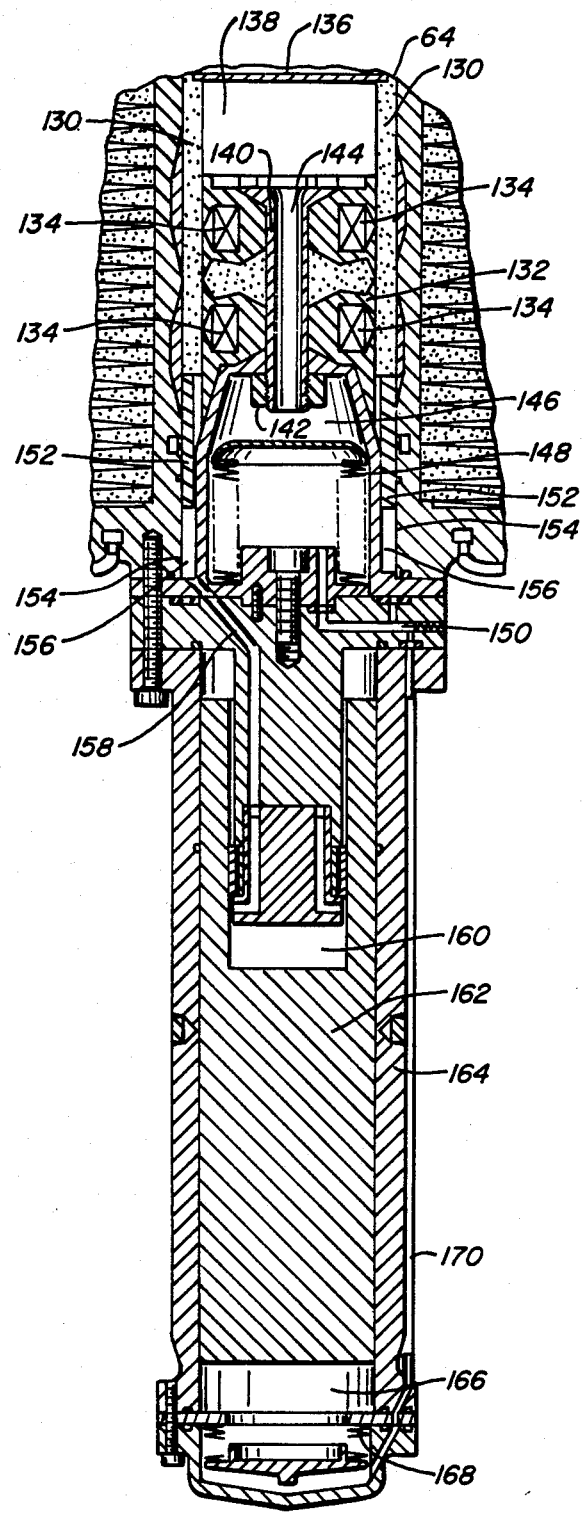
FIG._5.

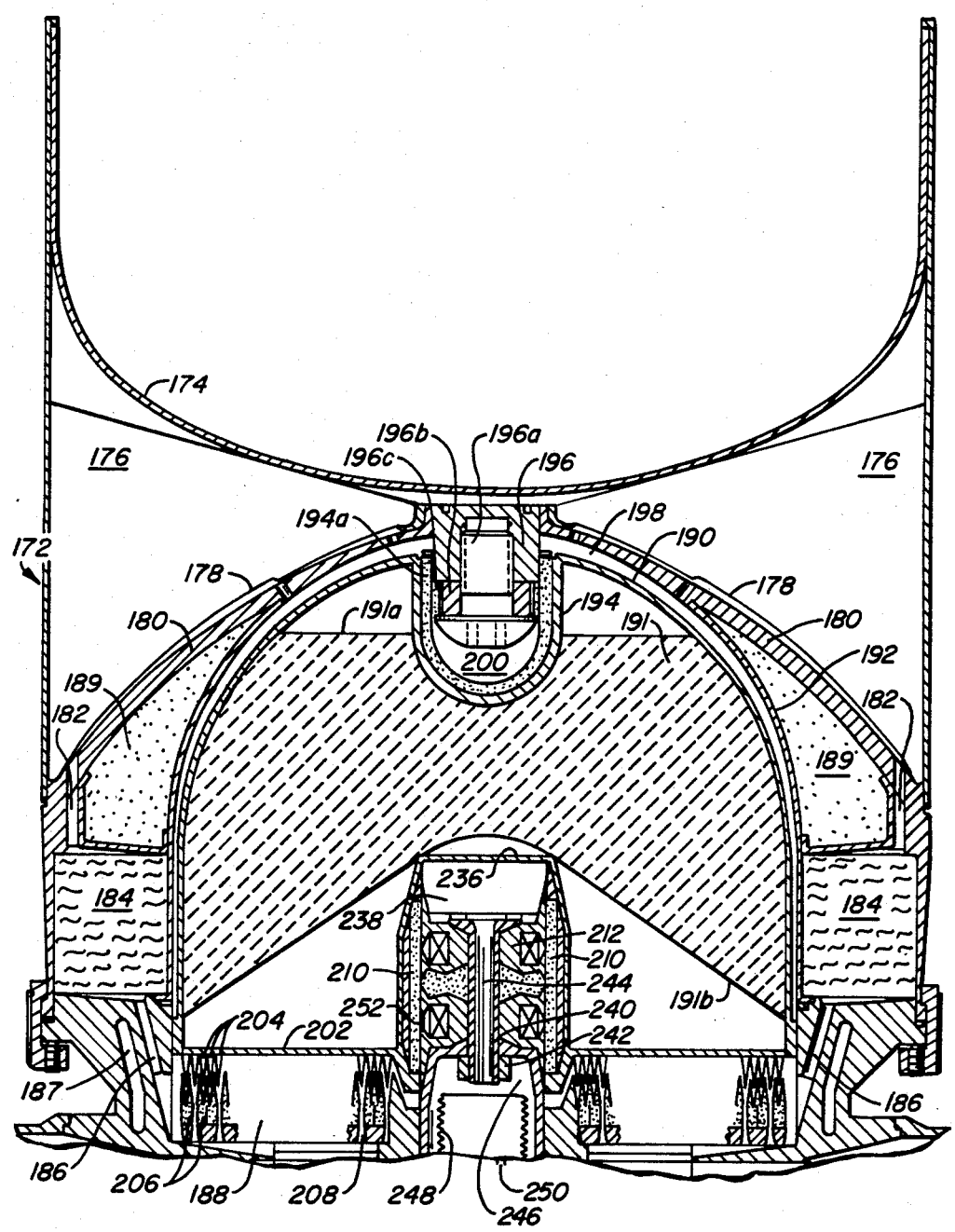
FIG._6.

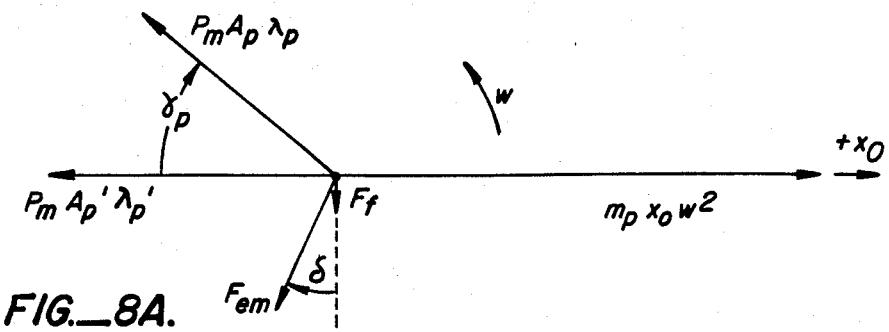
FIG._8A.
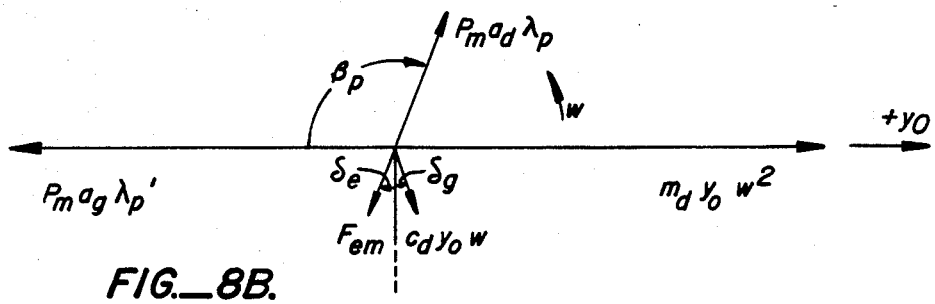
FIG._8B.
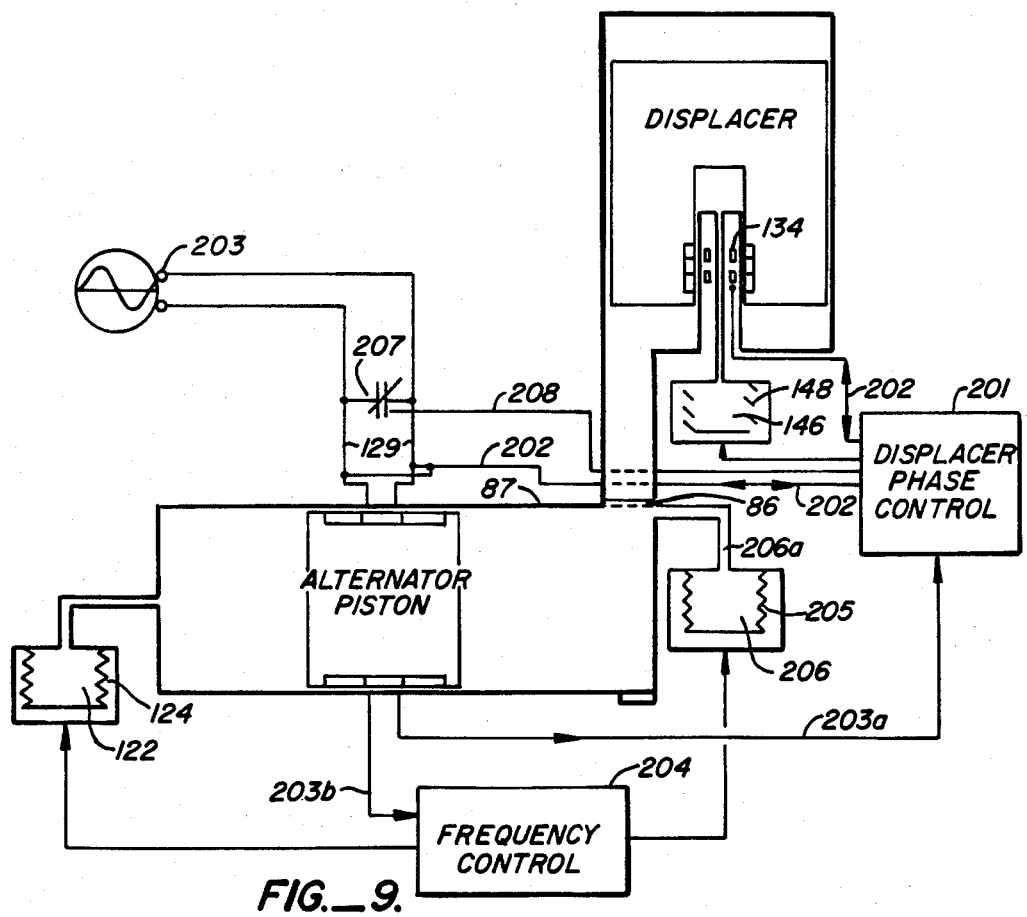
FIG._9.

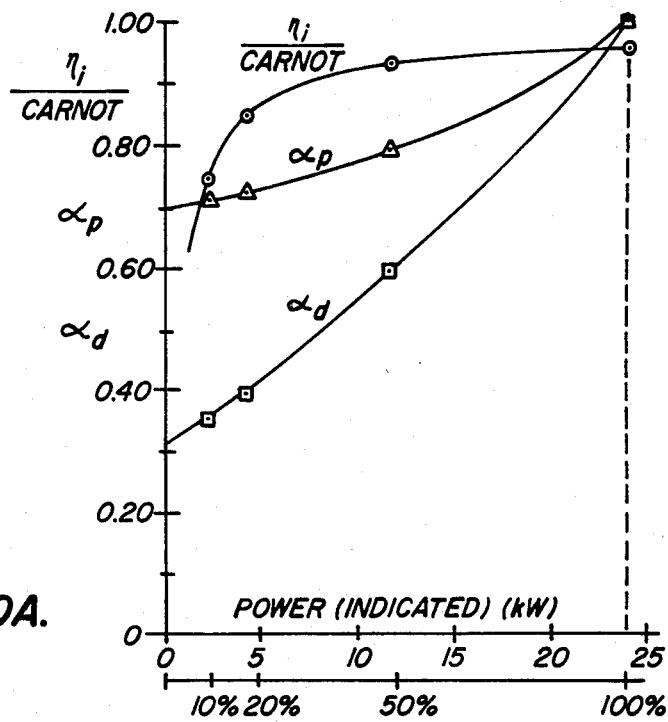
FIG._10A.
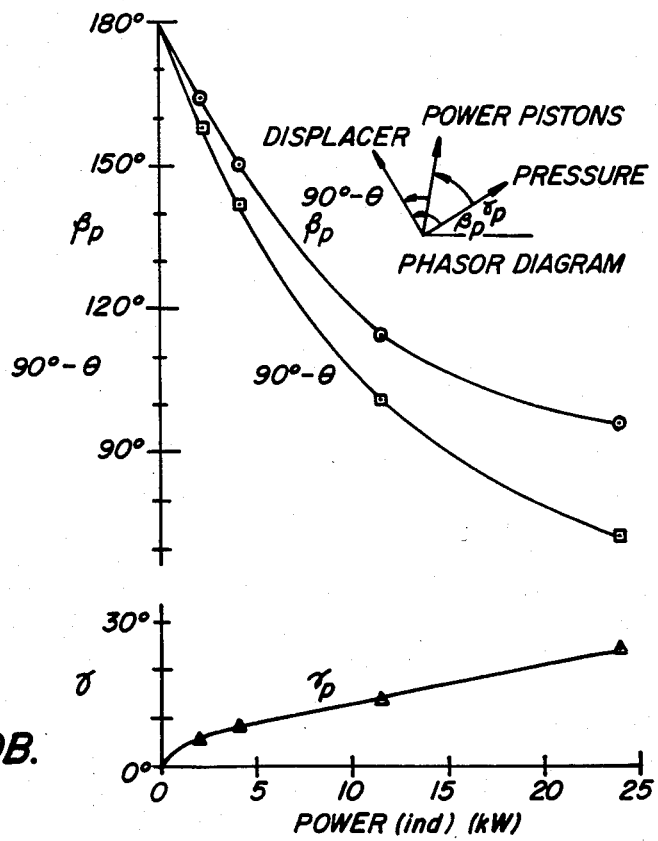
FIG._10B.

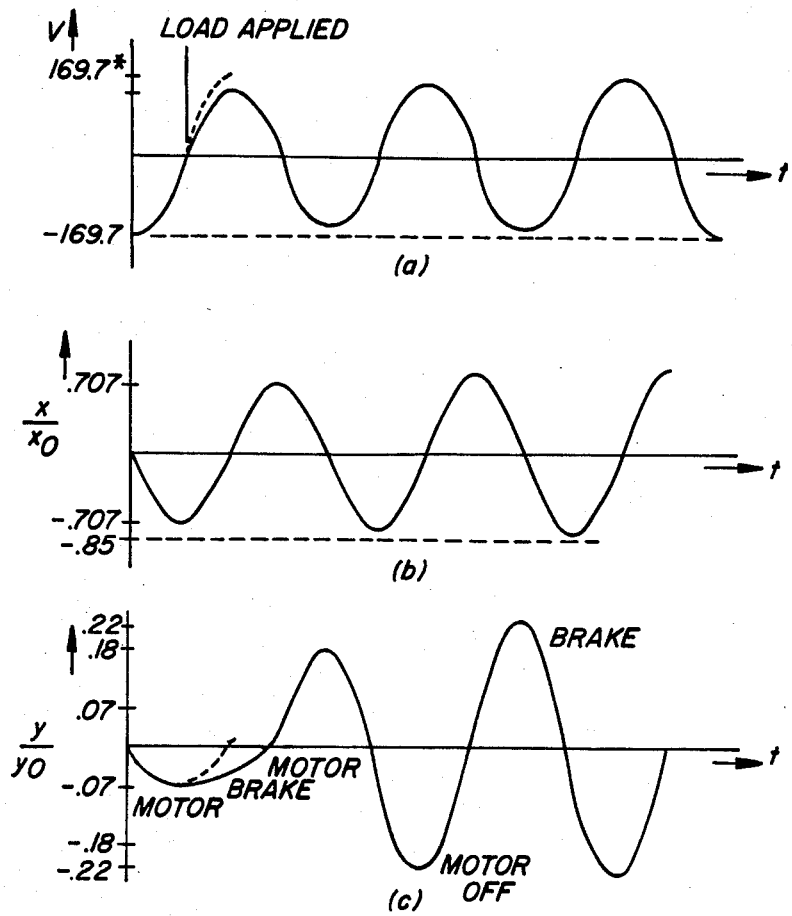
FIG._11.
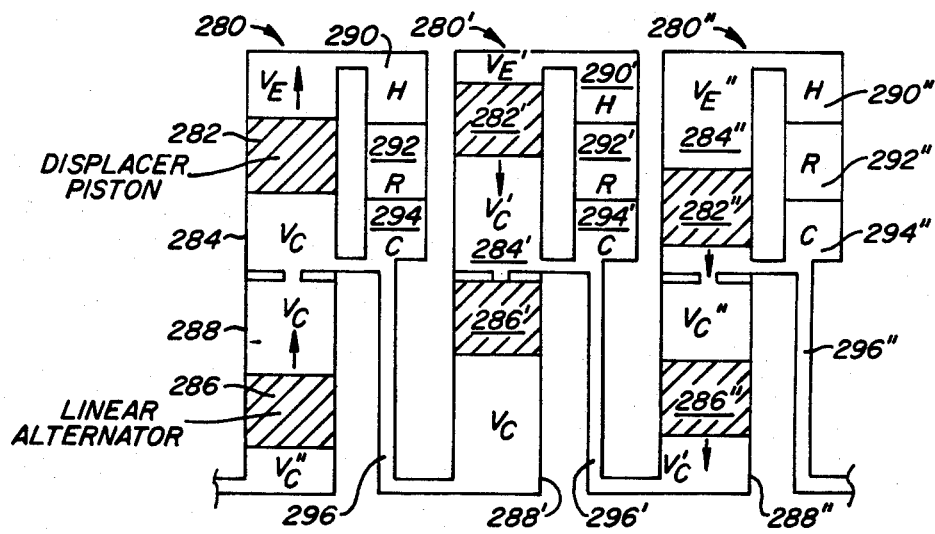
FIG._13.

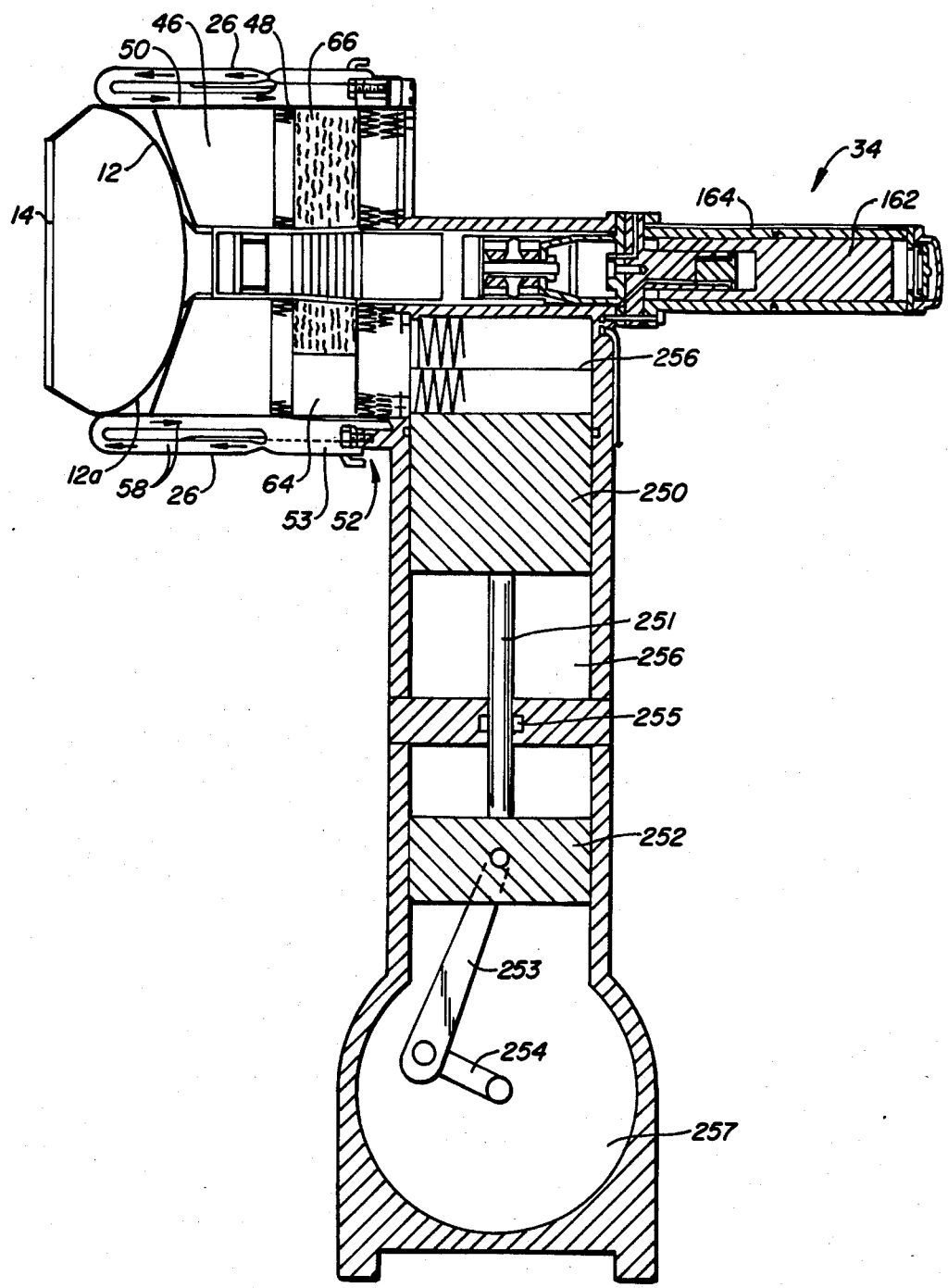
FIG._12.

SOLAR POWERED FREE-PISTON STIRLING ENGINE

This application is a continuation-in-part of my co-pending application of the same title, Ser. No. 06/292,771, filed Aug. 14, 1981, now abandoned.

BACKGROUND OF THE INVENTION

1. Field of the Invention

This application relates to a system for utilizing solar power to drive a free-piston Stirling engine, and in particular a Stirling engine primarily designed for that application.

2. Description of the Prior Art

One of the most sought after goals in the field of energy conversion is the efficient transfer of solar energy to other usable forms of energy, such as heat energy, mechanical energy and electrical energy. To some extent such efforts have been successful, but only in limited applications, such as the heating of water, passive space heating, and the like. To date, the efficient conversion of solar energy into electrical energy has eluded those working on the problem. The conversion of solar energy to electrical energy has only been accomplished on a very small scale, or in situations where cost effectiveness is not a primary consideration, such as the power of satellite experiments.

In an area of technology hitherto unrelated to solar energy conversion, work has been done on the development of Stirling engines. Stirling engines require a heat source, typically provided by fossil fuel combustion. On paper, at least, the Stirling engine makes very efficient use of heat energy, and it is an attractive alternative to other heat energy devices, such as the internal combustion engine. However, in practice Stirling engines have been unable to achieve their theoretical efficiency.

Several Stirling cycle free piston machines are described in my U.S. Pat. No. 4,044,558 all of which function as resonant thermomechanical oscillators in which the oscillating elements harmonically oscillate at resonant frequency but at a controlled phase difference. In this former patent the resonant frequency is tuned by varying the volume of at least one gas spring chamber and the phase angle between oscillating elements is varied by varying the dead volumes of the gas spring chambers which may be filled with a matrix to cause the compression and expansion of the gas spring fluid to be isothermal processes so as to minimize the gas spring hysteresis losses.

SUMMARY OF THE INVENTION

The present invention provides a Stirling engine design which is solar powered. A solar receiver converts solar radiation to thermal energy, which is stored in a storage chamber. The engine includes a displacer chamber with a displacer piston which divides the chamber into hot and cold subchambers, the hot subchamber being heated by the storage chamber. A mechanism is provided for cooling the cold subchamber. The engine also includes an alternator chamber with an alternator piston which divides the chamber into working and bounce subchambers, the working subchamber being in fluid communication with the cold subchamber of the displacer. The working fluid, hermetically sealed within the machine, circulates through the cold subchamber and the working subchamber and obtains heat from the storage chamber. The working fluid is displaced by the displacer piston to drive the alternator piston, and work output is obtained from the alternator piston.

In the preferred embodiment of the invention, the displacer piston has an internal regenerator, with tapered concentric rings on each side with apertures allowing the working fluid to pass through the displacer piston. The cold subchamber is cooled by complementary tapered rings which are hollow and have a cold fluid circulated through the interior of the rings. The cold rings have apertures allowing the working fluid to pass between the rings from the cold subchamber to the working subchamber. Both the alternator chamber and the displacer chamber have variable volume gas springs to control the stroke of the respective pistons and allow for an efficient start-up operation.

In its preferred form, the present invention is an electrical generator driven by solar energy. The alternator piston, and preferably portions of the displacer piston, are annular and contain a plurality of magnets of alternating polarity. Stators are located within the reciprocating pistons, which have coils in which electrical energy is generated. The reciprocating magnets and stationary coils form a linear electric machine.

The primary purpose of the linear electric machine in the displacer is to control the stroke and phase of the displacer piston and thereby provide prompt and effective control of engine response to changing electrical loads while maintaining constant frequency and voltage output from the alternator. Such control is obtained by operating the displacer linear electric machine as either a generator or motor, and varying the output/input voltage. The primary purpose of the alternator is to generate electric power for delivery to the electric grid at matching voltage and frequency. As a result, the Stirling engine efficiently converts the heat energy from the solar radiation into mechanical energy in the form of reciprocating pistons, which is in turn efficiently converted into electrical energy by the alternator coils.

The novel features which are characteristic of the invention, as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an elevation view of the preferred embodiment of the present invention with portions broken away;

FIG. 2 is a section view of the Stirling engine portion of the embodiment of FIG. 1, and FIG. 2A is a section view taken along lines 2A—2A of FIG. 2;

FIG. 3 is an enlarged fragmentary section view of the displacer portion of the Stirling engine of FIG. 2;

FIG. 4 is an enlarged fragmentary section view of the alternator portion of the Stirling engine of FIG. 2 and FIG. 4A is an alternative embodiment of the variable volume gas spring;

FIG. 5 is an enlarged fragmentary section view of the balancer piston portion of the Stirling engine of FIG. 2;

FIG. 6 is an enlarged fragmentary section view of an alternate embodiment of the displacer portion of the Stirling engine of FIG. 2.

FIG. 7 is a cross-sectional view of an alternative embodiment of the linear alternator of the engine illustrated in FIG. 2;

FIGS. 8A and B are phasor diagrams for the alternator and displacer pistons respectively;

FIG. 9 is a schematic layout of the engine control system of the present invention;

FIGS. 10A and B are graphical representations illustrating stroke dependency of the alternator piston and displacer piston on electric load, and variation of engine phase angles as a function of power output, respectively;

FIG. 11 is a graphical representation of the variation of output voltage, alternator piston stroke and displacer piston stroke vs. time for a suddenly applied electrical load;

FIG. 12 is a cross-sectional view of an alternative embodiment to the engine shown in FIG. 2 with the power piston being crank connected;

FIG. 13 is a schematic depiction of the use of three Stirling engines constructed according to the teachings of the present invention for producing three-phase electrical output;

FIG. 14 is a schematic depiction of the hybrid gas bearing utilized in the preferred embodiments of the present invention.

DESCRIPTION OF THE PREFERRED EMBODIMENTS

The preferred embodiment 10 of the solar powered Stirling engine of this invention is illustrated generally by way of reference to FIG. 1. A solar collector 12 with a window 14 is located in a housing 16 otherwise filled with thermal insulating material 18. A linear actuator 20 controls a shutter 22 controlling access to the aperture 24 to collector 12. Combustion tubes 26 are provided to supply heat energy when solar energy is insufficient to operate the system.

The Stirling engine is located in housing 28, and includes a displacer 30, a pair of alternators 31, 32, and a balancer assembly 34. Except for displacer 30 which extends into insulated chamber 16, the Stirling engine is located in an open frame 36 having closed mounting ring 45 at the bottom of which is a downwardly operating fan 38 located in throat 40. A tubular conduit 42 emanates from displacer 30, and is connected to a coiled conduit 44 mounted to frame 36. Fan 38 thus draws cooling air over coiled conduit 44, and cools the fluid in conduit 44.

The preferred embodiment of the Stirling engine and attached solar collector is illustrated in more detail by way of reference to FIG. 2 together with FIGS. 2A-5, in which various portions of the Stirling engine are enlarged for clarity. Solar receiver 12 with window 14 is located immediately above storage chamber 46. Storage chamber 46 is preferably comprised of thermal storage tubes 46a, support struts 46b, hot gas spring cylinder 46c, and heat transport fluid in flow channels 46d. The storage tubes are preferably filled with a phase change material having a melting point in the range of about 1500°-2500° F., such as sodium borate, sodium fluoride, silicon, lithium fluoride, and the like. On the under side of storage chamber 46 are located a plurality of concentric tapered projections 48 of heat conductive material. The wall 50 of storage chamber 46 is preferably lined with a wick which pumps by capillary action the liquid heat transport fluid to the receiver underside surface 12a on which boiling of fluid occurs. The vapor, so formed, is transported downward through flow channels 46d impinging on the upper side surface of ring projections 48 where condensation of the heat transport fluid occurs. Ring projections are preferably hollow and filled with a porous material such as reticulated or webbed silicon nitride. This heat transport process employing phase-change fluids such as alkaline metals (e.g. lithium, or sodium), zinc, or the like, equalizes the temperature throughout receiver 12, storage chamber (or catalytic burner) 46, and ring projections 48 to an equilibrium temperature typically about 1500°-2500° F.

Supplementary combustor tubes 26 have an inlet portion 52, a preheater section 53a, a venturi throat 54 with a fuel injector 56, a combustion chamber 58 in which the fuel is burned, and a recuperator section 53b in which exhaust heat recovery occurs. The heat of combustion and the exhaust gases provide heat to storage chamber 46 when solar energy is inadequate. An exhaust 60 vents the exhaust gases, which are drawn away by fan 38 (see FIG. 1).

Displacer 30 includes a displacer cylinder 62 and a displacer piston 64, shown in top dead center position in the Figures. Hydrostatic gas bearing 65 lubricates the piston. Displacer piston 64 is filled with regenerator material 66, preferably reticulated silicon nitride, although other materials could also be used. A plate 68 overlies the upper face of regenerator piston 64, and a plurality of hollow tapered rings 70, preferably filled with a porous material, are mounted to plate 68. Rings 70 are complementary to projections 48 on storage chamber 46, so that the projections and rings nest together when displacer piston 64 is in its top dead center position to virtually eliminate dead space between them.

Rings 70 overlying plate 68 have a serrate configuration viewed in section, as in FIGS. 2 and 3. Small apertures 72 extend beyond the bases of rings 70 and through mating holes in plate 68, thereby forming flow passages that seal voids 70a in hollow rings 70. When displacer piston 64 moves away from its top dead center position, a working fluid located within regenerator 64 and elsewhere in the system fills the void 55 formed between projections 48 and rings 70 during downstroking, through apertures 72. This working fluid is heated by conduction and convection processes in the space on top of displacer piston 64, termed the "hot side" of the displacer piston. The chamber formed between the displacer piston and the storage chamber is designated the "hot subchamber" of the displacer.

The bottom face of displacer piston 64 is covered by a plate 74, on which are mounted concentric hollow tapered rings 76. Apertures 78 are provided in the bases of ring 76 and plate 74. Beneath tapered rings 76 are a plurality of hollow tapered rings 80 with thin metallic walls fabricated, for example, from nickel alloys. Rings 80 may be filled with a porous material such as reticulated nickel alloys. Tapered rings 80 are complementary to and nest within rings 76 when displacer piston 64 is in bottom dead center position, both rings 76 and 80 having a serrate configuration in section. In FIGS. 2 and 3, displacer piston 64 is shown in its top dead center position, leaving a space 82, designated the cold subchamber. A cooling fluid such as Freon TM or water is circulated through the hollow interior of rings 80, and is itself cooled in external conduit 44 (see FIG. 1). The term "hollow" as used herein includes the situation where the ring is filled with porous material.

A plurality of apertures 84 are located between the concentric rings 80. Annular chambers 86 circumscribe the housings 87, 88 for alternators 31, 32 respectively, providing fluid communication between cold subchamber 82 and the interior of alternators 31, 32 through apertures 84 in tapered rings 80. A working fluid, typically hydrogen or helium, circulates through the system. The working fluid is heated on the hot side of displacer piston 64, passes through the regenerator 66 internal to the piston, is cooled in cold subchamber 82, and passes through apertures 84 and rings 80 into the working subchambers to drive alternators 31, 32. The thermodynamics and fundamentals of the operation of the system described in general terms in my U.S. Pat. Nos. 3,928,974 and 4,044,558.

Displacer piston 64 has a central upper plug portion 90 which extends into a cup-shaped chamber 92 filled with a bounce gas which acts as a gas spring. With displacer piston 64 at its top dead center position as illustrated, the pressure in chamber 92 has increased, tending to drive the displacer piston back downwardly. Also, the central portion 94 of displacer piston 64 internal to regenerators 66 is tapered, causing the diameter of displacer rod 130 to be larger than plug 90, and resulting in the hot side of the displacer piston having a larger cross-sectional area exposed to the working fluid than the cold side of the displacer piston. The differential area so formed when acted on by an increase in working gas pressure forces displacer piston 64 downward transporting the working fluid through apertures 84 into piston chambers 31a and 32a.

Alternators 31, 32 are mirror images of one another, and piston 32 is illustrated in detail in FIG. 4. A plurality of stationary concentric tapered projections 100 project into alternator chamber 102. An annular alternator piston 104 circumscribes a stationary stator 106. A plate 108 is located at the left end of alternator piston 104, and has a plurality of concentric tapered projections 110 emanating therefrom. Projections 110 are complementary to and nest with projections 100 at the leftmost position of alternator piston 104 as illustrated in FIG. 4.

Alternator piston 104 moves in an annular chamber defined by alternator chamber wall 102 and the external periphery of stator 106. Hydrostatic gas bearing 105 lubricates piston 104. The volume 109 to the left of piston 104, between projections 100 and 110, is the working subchamber. A bounce chamber 112 is located to the right of piston 104, and contains a bounce gas which acting as a gas spring is compressed when the alternator piston moves to the right.

Behind plate 108 is an open volume 114 when alternator piston 104 is at its leftmost position. Stator 106 includes a bolt 116 and nut 118 which have a central passageway 120, leading into a chamber 122 to the right of the stator. A bellows 124 is located in chamber 122, and is pressurized by a controlled incompressible fluid source through conduit 126. As alternator piston 104 moves to the right, the gas in chamber 114, conduit 120 and chamber 122 is compressed, and the degree of compression depends upon the internal pressure in bellows 124 which determines the volume of the gas spring chamber 122. This controlled pressure, together with the pressure of bounce chamber 112, builds up and eventually forces alternator piston 104 back to the left. The stroke of the alternator piston before being forced back to the left is controlled by the fluid volume contained in bellows 124.

Conventional self-centering techniques are employed by providing a central groove in piston 102, which mates at the center with a connecting line 105 from chamber 122 and connecting line 107 to the working subchamber (FIG. 4).

Stator 106 includes a plurality of wire coils 128. Annular alternator piston 104 comprises a plurality of permanent magnets, denoted by dash lines 130. Adjacent magnets have alternate polarity, i.e., one of the magnets will have its north pole on the outside and the south pole on the inside, and the next will have the south pole on the outside and the north pole on the inside. This configuration produces magnetic circuits comprising stator element 106, backiron element 103, and one axial pair of magnets 104. As alternator piston 104 reciprocates the magnetic flux that couples with coils 128 is changed from a maximum value at end-stroke, to zero at mid-stroke, to a reversed maximum value at opposite end-stroke. This flux reversal induces a voltage in coils 128 which when connected to an external load circuit through electrical conduit 129 produces an electric current in the circuit thereby providing electric power to the grid load. Thus, the heat energy from the solar radiation has been collected, transferred into mechanical energy by movement of the pistons, and then converted into electrical energy.

In addition, an optional annular high temperature electrolyzer may be positioned around the heat storage chamber, as indicated by dashed line 29 shown in FIG. 1. High temperature electrolyzer 29 absorbs thermal energy from the storage chamber which, together with electric power from the alternator, produces hydrogen and oxygen from water vapor supplied to the high temperature electrolyzer.

An alternative embodiment of the variable volume gas spring is shown in FIG. 4A. The bellows is replaced with a plunger 125 that closely mates within hollow bolt 116. Plunger 125 is axially moved by servomotor having a stationary stator 125a, and an internally threaded rotor 125b that engages with threaded drive rod 125c through ball screw coupling 125d. A voltage pulse, supplied to the stator windings of the servomotor, provides an incremental rotation of the rotor, which in turn axially moves drive rod and plunger an incremental distance thereby incrementally changing the volume of the gas spring. This alternate embodiment permits hermetic sealing and self-containment of the gas spring variable volume producing means—in the embodiment of FIG. 4, a servomotor driven positive displacement element is used to vary the volume of the gas spring by displacing incompressible fluid contained within bellows 124, but the servomotor and displacement element are external to the engine housing and therefore are not shown.

The lower portion of displacer piston 64, and the operation of balance piston assembly 34, is illustrated by way of reference to FIG. 5 along with FIG. 2. The lower portion of the displacer piston includes an annular portion 130, consisting of a plurality of magnets of alternating polarity. A fixed stator 132 is located in the lower portion 130 of displacer piston 64, and includes two annular coils 134. When displacer piston 64 reciprocates, the magnets in portion 130 of the displacer piston move relative to coils 134, generating an electric voltage. Essentially, the lower portion of the displacer piston is a miniature version of the linear electric machine formed by alternator piston 104 and stator 106. The synchronous linear electric machine, so formed, functions as either a motor or alternator for controlling the displacer piston stroke and phase angle relative to the alternator piston.

Displacer piston 64 includes a plate 136 which defines an open volume 138 between the plate and stator 132. Stator 132 includes a bolt 140 and nut 142 having a central aperture 144 providing communication between chamber 138 at the top of the stator 132 and chamber 146 at the bottom. The volume of chamber 146 is controlled by a bellows 148 with a regulated pressure induced through conduit 150 to control the stroke of displacer piston 64. Alternately, the servomotor driven plunger embodiment, shown in FIG. 4A may be used for varying the volume of chamber 146.

The lowermost portion 152 of displacer piston 64 rides in a channel 154 defining an enclosed volume 156. A conduit 158 runs from enclosed volume 156 to a trapped volume 160 above a balancer piston 162. Balancer piston 162 reciprocates in a balance chamber 164, and is driven by pressures induced in volume 156. The return of balancer piston 162 is controlled by a gas spring 166, whose characteristics are adjustable by varying bellows 168 by altering the pressure of the incompressible fluid in conduit 170. Alternately, the servomotor driven plunger embodiment shown in FIG. 4A may be used for varying the volume of chamber 166.

As mentioned above, displacer piston 64 of the present invention is driven by differential area, a concept taught in my U.S. Pat. No. 4,044,558 (see, e.g., FIG. 3). However, in the present invention, unlike the above-referenced patent, differential area is achieved by a difference in the gas spring area. Specifically, the area of gas spring 90 is less than the total spring area provided by gas spring 146 and 156 (effectively a gas spring although connected to balance chamber 160). In the device shown in the above-referenced patent, the gas spring area was limited to the differential area of the piston, which is quite small—in the present invention, the gas spring area is substantially in excess of this differential area and further, this differential area may be independently selected from that of the gas spring. Indeed, the effect of the oppositely acting gas springs is cumulative, giving the engine of the present invention a much larger effective gas spring, which is necessary to counteract the larger inertial force caused by the heavier preferred displacer of this invention, than that available using the concepts disclosed in my prior patent.

An alternative embodiment 172 of the displacer piston is illustrated by way of reference to FIG. 6. The remainder of the Stirling engine is as illustrated in FIG. 2. A solar receiver 174 captures incident solar radiation and heats storage chamber 176, filled with a phase change heat transport fluid described previously.

A circumferential heat exchanger 178 overlies an inverted bowl-shaped pressure vessel 180 forming the lower boundary of storage chamber 176. Heat exchanger 178 terminates in conduits 182 which pierce through pressure vessel 180, leading to a stationary, porous, annular regenerator 184 contained within pressure vessel 180. Conduits 186, cooled by coolant channels 187, lead from regenerator 184 to cold subchamber 188.

A dome-shaped displacer piston 190 is located within an inverted bowl-shaped cylinder defined by a portion of wall 180 and by wall 192. Wall 192 is supported by stuffer 189, preferably a porous material. The upper portion of displacer cylinder 190 has a cup-shaped depression 194, mating with a corresponding cup-shaped projection 196. A bounce gas, trapped in volume 200 between depression 194 and projection 186, serves as the hot gas spring. The working gas contained in volume 198 between walls 180 and 192 and displacer piston 190 represents the hot volume of working gas and corresponds with volume 55 of FIG. 3. Cup projection 196 comprises bolt 196a, spacer ring 196b, and self-centering narrow-clearance ring 196c. Ring 196c radially floats in bore insert 194a having identical thermal expansion to ring 196c. Displacer piston 190 contains support struts 191, and is filled with insulation which is encapsulated by upper and lower baffles 191a and 191b, respectively.

Plate 202 is provided on displacer piston 190, and has a plurality of concentric tapered projections 204 formed thereon and projecting into cold subchamber 188. A plurality of hollow concentric tapered rings 206 project upwardly and are complementary to projections 204. Rings 206 are hollow and cooled by a cooling fluid, and have apertures 208 allowing passage of the working fluid in cold subchamber 188 to the alternator, as in the previous embodiment. The term "hollow" as used herein includes the situation where the ring is filled with porous material.

In the alternate embodiment shown in FIG. 6, displacer piston 190 includes an annular portion 210 comprising a plurality of alternately disposed permanent magnets. Stationary stator 212 is located within annular portion 210. This linear electric machine in displacer piston 190 serves the same function as the corresponding linear electric machine in displacer piston 64 of the previous embodiment. Alternately, the servomotor driven plunger embodiment shown in FIG. 4A may be used for varying the volume of chamber 246.

In the alternate embodiment, displacer piston 190 includes a plate 236 which defines an open volume 238 between the plate and stator 212. Stator 212 includes a bolt 240 and nut 242 having a central aperture 244 providing communication between chamber 238 at the top of the stator 212 and chamber 246 at the bottom. The volume of chamber 246 is controlled by a bellows 248 with a regulated pressure of the incompressible fluid contained within bellows 248 induced through conduit 250 to control the stroke and phase angle of displacer piston 190.

Permanent magnet 210 of displacer piston 190 rides on stator 212. Torque winding 252 on circumference of stator 212 provides torque to permanent magnets 210, thereby rotating displacer piston 190 at a preferred rotational speed. This rotation induces a hydrodynamic film to be formed within annular clearance between magnets 210 and stator 212, with such gas film providing non-contacting support of displacer piston 190 within bore of magnets 210 and stator 212 and a non-contacting narrow-clearance between displacer piston 190 and displacer cylinder bore 192, and a non-contacting narrow clearance between hot gas spring bowl insert 194ai a and ring 196c.

The upper hot gas spring formed by elements 196 and 194 may be eliminated by increasing the diameter of cold gas spring volume 238 and increasing the power rating of the displacer linear driver comprising magnets 210 and stator 212 in order to absorb the greater mechanical power transferred from displacer 190 to linear driver due to the increase in diameter of gas spring 238.

In the alternate embodiment illustrated in FIG. 6, the working fluid is heated in heat exchanger 178, passes through regenerator 184, and into cold subchamber 188, as displacer piston 190 moves upwardly. Further, the working fluid moves from cold subchamber 188 through apertures 208 to the alternators to drive the alternator pistons (not shown).

In the embodiment of FIG. 6, the projecting displacer rings 204 and mating stationary hollow rings 206 may be eliminated thereby forming an open chamber 188 provided that the annular cooling passages 186 and adjacent coolant channels 187 are axially extended so as to provide adequate cooling surface. Such a change simplifies the design and reduces fabrication cost but decreases engine efficiency since heat no longer is rejected at a constant temperature, as required to achieve Carnot efficiency, the highest efficiency possible.

Further simplification and cost reduction may be obtained by eliminating the concentric tapered projections 100 in alternator chamber 102 and the mating alternator piston projections 110; however, the engine efficiency will be decreased even further.

In operation, the preferred embodiment of the present invention illustrated in FIGS. 1-5 receives heat in solar collector 12, or in combustor 26, heating storage chamber 46 to a high temperature. The heat in storage chamber 46 is transferred by the heat transfer fluid to the hot heat exchanger 40 and then to a working fluid in the hot subchamber overlying displacer piston 64, driving the displacer piston downwardly and generating electrical energy in the linear electric machine positioned at the lower (cold) portion of the displacer piston.

Downward movement of displacer piston 64 compresses the working fluid in cold subchamber 82, forcing the working fluid through the apertures 84 in cooled rings 80 into alternator 31, forcing the alternator piston 104 outwardly. Alternator piston 104 thus moves relative to stator 106, generating electricity which constitutes the work output of the machine. The start-up and operation of the device is controlled by various bounce chambers which are adjustable. The alternate embodiment of FIG. 6 differs from the initial preferred embodiment in the construction of the displacer piston.

An alternate embodiment of the linear alternator 31 is illustrated by way of reference to FIG. 7. The remainder of the Stirling engine is as illustrated in FIG. 2. The linear alternator comprises a solid plunger 260 of highly permeable material that is axially slotted to reduce eddy currents and overlaid with radially-poled permanent magnet tubular rings 261 with axially adjacent rings having alternate polarity similar in arrangement to piston 104 of FIG. 2. The axial slots in plunger 260 are filled with a non-magnetic insulator, such as epoxy, to eliminate blowby, and the tapered plunger recessed ends are filled with non-magnetic electrically insulating inserts 266. The right hand insert has attached to its face axially projecting rings 267 that mate with stationary complementary projecting hollow rings 267 that are cooled by a circulating fluid 268, similar to that used in FIG. 4. Outer housing 269 serves as the pressure vessel and the structural element for the linear alternator. Plunger 260 reciprocates in the bore 262 formed by external stators 263 formed of laminated silicon-steel and contain two annular coils 264 and an insulating mid-ring 265, such as ceramic. When plunger piston 260 reciprocates, the magnets 261 move relative to coils 264 thereby generating an electric voltage at terminal conduit 269 in a similar fashion to that of linear alternator 104 of FIG. 2.

The left end space 272 enclosed by housing 269 and metal bellows 270 forms the gas spring whose volume is controlled by adjusting the volume 273 of incompressible fluid contained within bellows 270 through fluid transfer via supply tube 271. Alternately, the servomotor driven plunger embodiment shown in FIG. 4A may be used for varying the volume of the gas spring.

This alternate embodiment of linear alternator permits the use of higher working fluid pressures, eliminates the need for a cantilever support of stator, and eases the cooling of stator coils.

The generating capacity of the alternator shown in FIG. 7 may be increased by adding additional coil-stator pairs and complementary magnet rings to an axially extended plunger 260 without changing the bore diameter of housing 269.

The operation of the present invention may be described by use of phasor diagrams since the machine operates at a resonant frequency with reciprocation of pistons being essentially sinusoidal so as to generate sinusoidal voltage output through electric conduit 129.

The phasor diagram for the alternator piston 104 is shown in FIG. 8a. The inertial force of this piston is $m_p x_o \omega^2$ which is represented by the vector so marked, where $m_p$ is piston mass, $x_o$ is piston half-stroke, $\omega$ is angular frequency ($2\pi f$) and $f$ is reciprocating frequency of piston. Opposing this inertial force are four forces: (1) the gas spring force $p_m A_p' \lambda_p'$ where $p_m$ is the mean pressure of the gas spring, $A_p'$ the cross-sectional area of the gas spring, and $\lambda_p' = (P_r' - 1)/(P_r' + 1)$ where $P_r'$ is the ratio of maximum gas pressure to minimum gas pressure of the spring; (2) the driving force produced by the working fluid $p_m A_p \lambda_p$ where $p_m$ is the mean pressure of the working fluid (which equals that of the gas spring), $A_p$ is the cross-sectional area of the armature piston, and $\lambda_p = (P_r - 1)/(P_r + 1)$ where $P_r$ is the ratio of maximum to minimum working gas pressures (This driving force vector lags the gas spring force vector by angle $\gamma_p$ i.e., the peak outward driving force on the piston occurs $\gamma_p$ degrees after inner dead center piston position); (3) the electromagnetic force reaction on the piston, $F_{em}$, which leads the gas spring force vector by angle 90-$\delta$ degrees; and (4) the mechanical (friction) drag force on the plunger, $F_f$, which leads the gas spring force vector by approximately 90 degrees. Balancing the horizontal force components, assuming a 90° leading friction drag force vector, yields:

$$m_p x_o \omega^2 = p_m(A_p' \lambda_p' + A_p \lambda_p \cos\gamma_p) + F_{em}\sin\delta \quad (1)$$

Balancing the vertical force components yields:

$$p_m A_p \lambda_p \sin\gamma_p = F_{em}\cos\gamma + F_f \quad (2)$$

Neglecting the frictional drag vector, $F_f$, owing to its small magnitude for a gas bearing supported piston, simplifies the model used in the following discussion.

For a given electrical power output all vectors maintain constant magnitude and angular relation. As the electrical power output increases at constant frequency, $x_o$, $F_{em}$, $\lambda_p$, $\gamma_p$, and $\delta$ increase requiring $\lambda_p'$ to be controllably decreased. Conversely with a decrease in electric power output, $\lambda_p'$ needs to be controllably increased. Such control is accomplished by changing the volume of alternator gas spring chamber 122 through movement of bellows 124 by changing the volume of incompressible fluid contained within bellows 124.

Control of engine variables $\lambda_p$, $\gamma_p$, and $x_o$ are accomplished by control of displacer piston 64 which is subject to the following five forces, assuming negligible mechanical (bearing) drag force, as shown in its phasor diagram of FIG. 7b; (1) the displacer piston inertial force $m_d y_o \omega^2$ where $m_d$ is piston mass, $y_o$ is piston half-stroke, and $\omega = 2\pi f$ where f is reciprocating frequency of piston; (2) the displacer piston driving force (produced by the periodically varying working gas pressure) $p_m a_d \lambda_p$ where $p_m$ is mean pressure of working gas, $a_d$ is the differential drive area (difference in cross-sectional area between cold gas spring 138 and hot gas spring 92), and $\lambda_p = (P_r - 1)/(P_r + 1)$ where $P_r$ is ratio of maximum to minimum pressures of the working gas; (3) the gas spring force $p_m a_g \lambda_p'$ where $p_m$ is mean pressure of hot and cold gas springs, $a_g$ is combined cross-sectional area of hot and cold gas springs and $\lambda_p' = (P_r' - 1)/P_r' + 1)$ where $P_r'$ is the ratio of maximum to minimum gas pressures in displacer hot and cold gas spring chambers; (4) the electromagnetic force reaction $F_{em}$ on the displacer; and (5) the damping force due to gas pressure-drops in the heat exchangers of the displacer, $c_d y_o \omega$, where $c_d$ is the lumped damping coefficient. Angle $\beta_p$ is the phase angle by which displacer motion leads pressure wave vector $(p_m a_d \lambda_p)$, $\delta_e$ is the electric driver force angle which leads the gas spring force vector by angle $90 - \delta_e$ degrees, and $\delta_g$ is the pressure drop force angle which leads the gas spring force vector by angle $90° + \delta_g$.

For steady-state operation at constant load, all vectors maintain constant magnitude and angular relation. As the electrical power output increases at constant frequency the variables $y_o, \lambda_p, c_d$, and $\delta_g$ increase requiring control over variables $\lambda_p'$, $F_{em}$, $\delta_e$, and $\beta_p$. Such control is accomplished by: (1) changing the volume of cold gas spring chamber 146 through movement of bellows 148 by changing the volume of incompressible fluid contained within bellows 148; and (2) changing the electromagnetic force vector $F_{em}$ in magnitude and direction through control of a variable reactance or variac (not shown) connected between coils 134 and the electrical conduit 129.

A schematic of the engine control for maintaining constant voltage and frequency independent of electric load is shown in FIG. 9. The output voltage at grid 203 is sensed by displacer phase control 201 through line 203a which then moves bellows 148, changing gas spring volume 146, and varies impedance of electric circuit 202 connecting displacer linear drive coils 134 to grid 203 through the displacer phase control. The frequency at grid 203 is sensed through line 203b by frequency control 204 and compared with the timing signal produced by a digital clock contained in frequency control 204. Drift of grid frequency from clock frequency is corrected by frequency control 204 which moves bellows 124, changing gas spring volume 122 and, if necessary, changing working gas mean pressure by moving bellows 205, which changes gas volume 206 contained within bellows 205 and connected by capillary conduit 206a to scroll chamber 86 of alternator cylinder 87. Capillary conduit 206a dynamically decouples volume 106 from piston working chambers 31a and 31b and therefore volume 206 acts as a gas reservoir rather than a gas spring. Hence, changes in gas volume 206 only change the mean pressure of the working gas $(p_m)$. Additional control may be provided by displacer phase control 201 varying capacitance 207 through control conduit 208.

Such control varies displacer and alternator piston stroke and relative phase angles, as shown in FIGS. 10A and 10B where $\alpha_d$ and $\alpha_p$ are fraction of full stroke of displacer piston and power (alternator) piston, respectively, and where angles $\alpha_p, \beta_p$ and $\theta$ are related by the phasor diagram inserted in FIG. 10B. As a result, both frequency and voltage at output grid 203 are maintained constant, independent of grid load.

The use of a displacer linear driver (also called a linear electric machine), such as shown in FIG. 5, comprising stator 132, coils 134 and magnets 130, provides fast response to rapid load changes, e.g. instant load application from a no-load condition. The engine response provided by the displacer driver is shown in FIG. 11, where grid voltage vs. time is shown in FIG. 11a fraction of full load stroke of alternator piston vs. time is shown in FIG. 11b and fraction of full load stroke of displacer piston vs. time is shown in FIG. 11c. The time of load application is shown in FIG. 11a. The voltage output droops as shown by the difference between the no-load projected voltage (represented by dashed line) and actual voltage (represented by solid line). To increase grid voltage, the alternator half-stroke, x, must increase (i.e. the ratio $x/x_o$ must increase, where $x_o$ is maximum half-stroke). This is accomplished by controlling the displacer piston stroke through use of the displacer linear driver, as shown in FIG. 11c. At no load, prior to load application, the linear driver acts as a motor (required to maintain voltage at the no load condition). Upon grid load application the linear motor is switched to generator operation, by displacer phase control 201, which produces a braking action on the displacer thereby decreasing its phase angle from 180° leading to approximately 90° leading. The phase control 201 then switches the linear driver to motor operation which rapidly increases the displacer piston stroke until grid voltage is returned to that required, at which time the phase control 201 switches the linear driver to generator operation (braking action) which represents the steady-state displacer load condition for the applied grid load.

Upon instant load loss from full load condition the above process is reversed. The displacer linear driver is instantly switched from full generator to full motor operation, which, combined with the displacer gas driving force $(p_m a_d \lambda_p)$, in one-quarter cycle advances the displacer phase angle from the full load angle of about 95° leading to the no load angle of 180° leading, which shifts the alternator driving force vector $p_m A_p \lambda_p$ to become colinear with the gas spring force vector (angle $\gamma_p$ becomes zero) resulting in no power transfer to the alternator piston.

Such rapid control prevents the displacer piston and alternator piston from overstroking on instant load loss and from stalling on instant load application.

This control means permits the frequency of the free-displacer piston to be controlled over a wide speed range, and allows the use of a free-displacer to drive a crank-coupled power piston, as shown in FIG. 12, where power piston 250 replaces alternator piston 104 of FIG. 2, piston rod 251 couples power piston 250 to cross-head 252, and connecting rod 253 couples cross-head piston 252 to crankshaft 254 and where seal means 255 seals engine working fluid 256 from crankcase volume 257. The above described displacer piston control system permits this Stirling engine type to operate controllably over a wide speed and load range, and enables the crankshaft 254 to drive a conventional rotary generator.

The free piston Stirling machine described above can be read in multiples, as illustrated in FIG. 13, depicting schematically three separate machines 280, 280', 280" each " each consisting of a displacer piston 282, displacer cylinder 284, alternator piston 286, alternator cylinder 288, heater 290, regenerator 292 cooler 294 and connecting conduit 296. Each connecting conduit connects the lower alternator piston chamber of one machine to the upper alternator piston chamber of the alternator cylinder of the adjacent machine. This connecting arrangement causes each alternator piston to function as a double-acting piston in that a separate pressure driving wave acts on each side of the alternator piston and, in addition, constrains the three alternator pistons to reciprocate with a 120° relative phase difference. This constraint is produced by the dynamics of a 3-body, resonant oscillator mutually coupled by resilient springs and, in addition, by the pressure wave driving force which is maximum at a 120° relative phase difference between alternator pistons, as described in my previous invention (U.S. Pat. No. 4,044,558). This pressure wave effect may be illustrated by assuming that one alternator piston begins to lead (advance beyond a 120° phase angle) the adjacent piston. This lead causes a lag to be produced with the other adjacent piston. The lead couples less gas-work to the piston face while the lag couples more gas-work to the opposite face of the piston. The resulting work transfer to the piston per cycle causes a positive restoring force that returns the phase angle to 120°. A lagging condition produces a mirror force and work transfer and therefore again returns the phase angle to 120°.

The control system of the present invention also permits three single-phase generator sets, such as shown in FIG. 1, to be coupled together to provide three-phase electric power by controlling the phase angle of each single-phase generator set to be maintained precisely at 120° relative to the other two generator set phase angles, even under phase unbalanced electrical loads. This eliminates the need for interconnecting working fluid conduits 290 between separately positioned generator sets, as shown schematically in FIG. 13, and greatly facilitates installation of separate single phase solar dish generator sets for three-phase grid connection.

The gas bearings employed to provide non-contacting support of the displacer piston and alternator piston of this invention operate by generating a hydrodynamic film through rotation of the pistons or by employing a hydrostatic film through use of pressurized reservoirs pumped by the periodic pressure wave of the engine working fluid. These gas bearings are capable of providing non-contacting support only during operation of the engine. In order to provide non-contacting support of the pistons during startup and shutdown a separate support means is necessary. This support means employed in this invention is shown in FIG. 14 and comprises an actuator 300, such as solenoid, an actuator rod 301, which drives metal bellows 302, a gas reservoir 303, a conduit 304 which connects reservoir 303 to cylinder wall contained manifold 305 that in turn feeds hydrostatic gas bearing orifices 306, and a return bleed orifice 307. Alternately, bellows 302 may be replaced by a close-fitting plunger.

Prior to startup, actuator 300 is energized, which extends rod 301 and bellows 302 so as to compress gas in chamber 303, conduit 304, and manifold 305, so as to flow gas through orifices 306, thereby generating a hydrostatic gas film for non-contacting support of piston. Such support is provided during the time interval required to establish gas bearing support by the engine either through bringing the piston 104 up to operating rpm or pressurizing a pressure reservoir for feeding orifices 306. After achieving engine generated support, actuator 300 is de-energized and pressurized gas flows from chamber 31 to chamber 303 through bleed orifice 307, thereby refilling chamber 303 by driving bellows 302 and rod 301 to the fully retracted position, thereby readying the unit for the next startup cycle.

The above descriptions have detailed a Stirling engine driving an electric alternator, preferably of the synchronous type. Owing to the self-reversible features of the Stirling engine and synchronous alternator, the above invention will automatically shift to an electric motor driven Stirling cooler wherever the synchronous alternator is connected to the grid and insufficient thermal power is provided at the receiver 12 or heated chamber 46 to provide net engine output. As a result, this invention has the utility for providing refrigeration and cryogenic cooling in chamber 46 or cooling loads attached to surface 12. Further, since the displacer section 30 is separate from the linear alternator/motor section 31, the displacer section 30 may be positioned remotely from the linear alternator/motor section 31 and coupling provided by extension of working gas conduit 86 so as to form a free-piston split Stirling machine.

While preferred embodiments of the present invention have been illustrated in detail, using fuel combustion or solar energy as the heat source for chamber 46, other thermal energy forms such as provided by radionuclide decay or nuclear energy could be used to remotely heat the heat transport fluid in chamber 46. Therefore, it is to be expressly understood that such modifications and adaptations are within the spirit and scope of the present invention, as set forth in the following claims.

I claim:
1. A solar-powered Stirling engine comprising:
   a solar receiver which converts solar radiation to thermal energy;
   a storage chamber for thermal energy in heat transfer communication with the receiver;
   a displacer including a displacer chamber and a differential area displacer piston with variable electromagnetic damping means dividing the displacer chamber into separate hot and cold subchambers respectively, the hot subchamber being in heat transfer communication with the storage chamber;
   means for cooling the cold subchamber;
   an alternator including an alternator chamber and an alternator piston dividing the alternator chamber into working and bounce subchambers respectively, the working subchamber being in fluid communication with the cold subchamber of the displacer;
   a working fluid circulating through be cold subchamber and the working subchamber and in heat transfer communication with the storage chamber, said working fluid being displaced by the displacer piston to drive the alternator piston; and
   means for obtaining work output from the alternator piston.

2. The engine of claim 1 wherein the displacer piston includes an internal regenerator, and wherein the working fluid circulates between the hot and cold subchambers through the internal regenerator.

3. The engine of claim 1 and additionally comprising a regenerator external to the displacer, and conduit means conducting the work fluid from the cold subchamber through the regenerator to a position in heat transfer communication with the storage chamber.

4. The engine of claim 1 and additionally comprising a combustion heater in heat transfer communication with the storage chamber for supplying heat in the absence of sufficient solar radiation.

5. The engine of claim 1 wherein the work output obtaining means comprises a linear electric alternator stator proximate the alternator piston and the alternator piston has annular permanent magnets of alternating polarity.

6. The engine of claim 1 and additionally comprising a balance piston operating in opposition to the displacer.

7. The engine of claim 1 wherein the alternator includes a pair of mirror-image alternators operating in synchronization.

8. The engine of claim 1 wherein the storage chamber and the displacer piston have mating tapered concentric rings to minimize dead volume in the hot subchamber.

9. The engine of claim 8 wherein the displacer piston includes an internal regenerator, wherein the ends of the displacer piston defining the hot subchamber and the cold subchamber are porous, and wherein the working fluid circulates through the regenerator.

10. The engine of claim 9 wherein the displacer chamber and displacer piston have confronting concentric tapered rings to minimize dead volume in the cold subchamber.

11. The engine of claim 10 wherein the rings in the displacer chamber confronting the displacer piston have apertures at the bases of the tapered rings to allow the working fluid to pass through the apertures from the cold subchamber to the working subchamber.

12. The engine of claim 11 wherein the concentric rings on the displacer chamber are hollow, and additionally comprising means for flowing a cooling fluid through said hollow ring to cool the cold subchamber.

13. The engine of claim 12 wherein the cooling means comprises a conduit for a cooling fluid external to the Stirling engine, and additionally comprising a fan for drawing ambient cooling air over the Stirling engine and the conduit.

14. The engine of claim 13 wherein the cooling fluid is a phase-change fluid.

15. The engine of claim 1 wherein the displacer piston includes concentric tapered rings projecting into the cold subchamber, and wherein the cooling means comprises a plurality of hollow concentric tapered projections extending into the cold subchamber, said projections being complementary to and meshing with the tapered rings of the displacer piston, said projections including apertures between adjacent projections so that the working fluid circulates between the cold chamber and the working subchamber through the projections.

16. The engine of claim 1 wherein the alternator piston and portions of the alternator chamber defining the working subchamber include confronting complementary tapered concentric rings which nest together to minimize dead volume.

17. The engine of claim 1 wherein the alternator piston is annular and comprises a plurality of magnets, and wherein the work output obtaining means comprises a stator core within the annular alternator piston with coils in which electrical voltage is generated by the moving magnets of the alternator piston.

18. The engine of claim 1 and additionally comprising a displacer gas spring on the cold side of the displacer to bias the displacer piston back toward the hot side of the displacer.

19. The engine of claim 18 wherein the volume of the displacer gas spring is variable to alter the stroke of the displacer piston.

20. The engine of claim 1 wherein the alternator includes an alternator gas spring in the bounce subchamber, and means for varying the volume of the alternator gas spring to vary the stroke of the alternator piston.

21. The engine of claim 1 wherein the storage chamber contains an alkaline metal as the phase-change heat transfer fluid.

22. The engine of claim 1 wherein the storage chamber includes containers encapsulating a phase change material for storing thermal energy.

23. The engine of claim 1 wherein the alternator includes two co-linear alternators having armature pistons that stroke in phase opposition, and additionally comprising a balance piston co-linear with the displacer piston that strokes in phase opposition relative to the displacer piston.

24. The engine of claim 1 wherein the solar receiver, the storage chamber and the displacer comprise an integral unit.

25. The engine of claim 24 wherein the solar receiver, storage chamber and displacer are of equal diameter.

26. The engine of claim 24 wherein the solar receiver, storage chamber and displacer are constructed of materials having substantially equal thermal expansion properties.

27. The engine of claim 1 wherein the cold subchamber cooling means comprises an air-cooled radiator.

28. The engine of claim 27 wherein the radiator is integral with the engine.

29. The engine of claim 1 wherein the alternator piston is solid and includes a plurality of annular magnets, and wherein the work output means includes a stator circumscribing the alternator piston with coils in which an electric voltage is generated by the moving magnets of the alternator piston.

30. The engine of claim 1 wherein the displacer piston is impervious to the working fluid, and additionally comprising an annular regenerator circumscribing the displacer piston, the working fluid circulating through said regenerator.

31. The engine of claim 1 wherein the work output obtaining means comprises a crank for obtaining mechanical work output.

32. The engine of claim 1 wherein said storage chamber includes extended surface area for enhancing said heat transfer.

33. The engine of claim 7 wherein the bounce subchambers of each alternator are interconnected to center the alternators.

34. The engine of claim 8 wherein the rings are hollow and include an internal reinforcing structure to prevent deformation.

35. The engine of claim 10 wherein the rings are hollow and include an internal reinforcing structure to prevent deformation.

36. The engine of claim 20 wherein the varying means includes means for maintaining a constant reciprocation frequency by varying stroke and phase to provide a constant voltage output.

37. A solar powered electrical generator comprising:
a solar receiver which converts solar radiation to thermal energy;
a storage chamber for thermal energy in heat transfer communication with the receiver;
a Stirling engine including a displacer piston thermally coupled to the storage chamber and driven by heat from the storage chamber, and an alternator piston driven by the displacer piston, the alternator piston being annular and including a plurality of magnets of alternating polarity; and
a stator within the alternator piston and including coils in which electricity is generated by the magnets in the alternator piston.

38. The generator of claim 37 wherein the Stirling engine comprises a displacer including a displacer chamber, the displacer piston dividing the chamber into separate hot and cold subchambers respectively, the hot subchamber being in heat transfer communication with the storage chamber; means for cooling the cold subchamber; an alternator including an alternator chamber, the alternator piston dividing the alternator chamber into working and bounce subchambers respectively, the working subchamber being in fluid communication with the cold subchamber of the displacer; and a working fluid circulating through the cold subchamber and the working subchamber and in heat transfer communication with the storage subchamber, said working fluid being displaced by the displacer piston to drive the alternator piston.

39. The generator of claim 38 wherein the cooling means comprises a conduit for a cooling fluid external to the Stirling engine, and additionally comprising a fan for drawing ambient cooling air over the Stirling engine and the conduit.

40. The generator of claim 37 and additionally comprising a combustion heater in heat transfer communication with the storage chamber for supplying heat in the absence of solar radiation.

41. The generator of claim 37 wherein the Stirling engine includes a pair of mirror-image alternator pistons, and a pair of mirror-image stators within the respective alternator pistons.

42. The generator of claim 37 wherein the storage chamber contains an alkaline metal as the phase-change heat transfer fluid.

43. The generator of claim 37 wherein the storage chamber includes containers encapsulating a phase change material for storing thermal energy.

44. The generator of claim 37 wherein the displacer piston has an annular portion comprising a plurality of magnets of alternating polarity, and additionally comprising a displacer stator within the annular portion of the displacer piston, said displacer stator including coils in which electricity is generated by the magnets in the moving displacer piston.

45. The generator of claim 37 wherein the solar receiver includes a shutter to prevent loss of heat energy when solar radiation is unavailable.

46. The generator of claim 37 wherein the displacer piston is located within a displacer cylinder, and wherein the solar receiver, the storage chamber and the displacer cylinder are integral.

47. The generator of claim 46 wherein the displacer cylinder, the solar receiver and the storage chamber are of equal diameter.

48. The generator of claim 47 wherein the displacer cylinder, the solar receiver and the storage chamber are constructed of materials having substantially equal thermal expansion properties.

49. A Stirling engine comprising:
a heat source;
a displacer including a displacer cylinder and a displacer piston reciprocal in the displacer cylinder and dividing the displacer cylinder into hot and cold subchambers respectively, the hot subchamber being in heat transfer communication with the heat source, the displacer piston including an internal regenerator, concentric tapered fins projecting into the cold subchamber, and apertures on the sides of the displacer piston confronting the hot and cold subchambers;
a plurality of hollow concentric tapered projections extending into the cold subchamber, said projections being complementary to and meshing with the tapered fins of the displacer piston, said projections including apertures between adjacent projections;
a cooling fluid circulated through the hollow projections to cool the cold subchamber;
an alternator including an alternator chamber and an alternator piston dividing the alternator chamber into working and bounce subchambers respectively, the working subchamber being in fluid communication with the cold subchamber of the displacer through the apertures in the projections;
a working fluid circulating between the hot and cold subchambers through the displacer piston, and the working subchamber through the projections, said working fluid being displaced by a displacer piston to drive the alternator piston; and
means for obtaining work output from the alternator.

50. The engine of claim 49 wherein the heat source includes a solar receiver which converts solar radiation to thermal energy, and a storage chamber for thermal energy in heat transfer communication with the receiver.

51. The engine of claim 49 in which the area of the displacer piston confronting the hot subchamber is larger than the area of the displacer piston confronting the cold subchamber.

52. The engine of claim 49 wherein the displacer piston has concentric tapered rings projecting into the hot subchamber, and in which the heat source includes concentric tapered projections extending into the hot subchamber, said projections being complementary to and meshing with the tapered rings of the displacer piston in the hot subchamber.

53. The engine of claim 49 and additionally comprising a balancer piston operating in opposition to the displacer piston.

54. The engine of claim 49 wherein the displacer includes a linear driver, and additionally comprising means for varying the status of the linear drive.

55. The engine of claim 54 and additionally comprising means for sensing the work output of the alternator and wherein the varying means is responsive to the sensing means.

56. The engine of claim 49 wherein the work output obtaining means from the alternator piston is a linear electric alternator.

57. The engine of claim 49 wherein the alternator includes a pair of mirror-image alternators operating in synchronization.

58. The engine of claim 49 and additionally comprising a conduit for the cooling fluid external to the Stirling engine, and additionally comprising a fan for drawing ambient air over the Stirling engine and the conduit.

59. The engine of claim 49 and additionally comprising a displacer gas spring on the cold side of the displacer to bias the displacer piston back toward the hot side of the displacer.

60. The engine of claim 49 wherein the volume of the displacer gas spring is variable to alter the stroke of the displacer piston.

61. The engine of claim 49 wherein the alternator includes an alternator gas spring in the bounce subchamber, and means for varying the volume of the alternator gas spring to vary the stroke of the alternator piston.

62. The engine of claim 49 wherein the heat source includes a combustor which converts fuel energy to thermal energy and a heat transport means for transferring the thermal energy to the hot subchamber.

63. The engine of claim 62 wherein the combustor and hot subchamber are ceramic and the heat transport means is a heat pipe with zinc heat transport fluid.

64. The engine of claim 63 wherein the ceramic is silicon carbide.

65. The engine of claim 63 wherein the ceramic is silicon nitride.

66. The engine of claim 62 wherein the combustor and hot subchamber are metal and the heat transport means is a heat pipe with an alkaline metal heat transport fluid.

67. The engine of claim 49 wherein the displacer is fabricated from ceramic compounds.

68. The engine of claim 67 wherein the ceramic compounds are silicon based compounds.

69. The engine of claim 49 wherein the displacer includes a gas spring of cross-sectional area $A_{hs}$ in the hot subchamber and a gas spring of cross-sectional area $A_{cs}$ in the cold subchamber, where $A_{cs}$ is greater than $A_{hs}$ and where $A_{cs}-A_{hs}$ yields a differential drive area that provides a drive force in opposition to the drag force of the displacer and where $A_{cs}+A_{hs}$ yields the effective area of the gas spring that provides a spring force in opposition to the inertial force of the displacer.

70. The engine of claim 69 wherein at least one gas spring has a variable volume that is adjusted in response to engine requirements.

71. The engine of claim 69 wherein, in addition, an electric drive means provides displacer control in response to engine requirements.

72. The engine of claim 69 wherein the gas spring in the hot subchamber comprises a self-centering sealing means.

73. The engine of claim 72 wherein the sealing means is a radially floating ring with gas bearing support.

74. The engine of claim 49 wherein the displacer piston and alternator piston are supported by gas bearing means.

75. The engine of claim 74 wherein the gas bearing means comprises hydrodynamic gas bearings provided by piston rotation.

76. The engine of claim 74 wherein the gas bearings means comprises hydrostatic gas bearings provided by the engine-contained gas that is pressurized by the amplitude of the gas pressure wave produced by the engine and stored in a valved reservoir supplying gas feed to the hydrostatic gas bearing orifices.

77. The engine of claim 74 wherein gas bearing support means during startup and shutdown is provided by a separate hydrostatic gas bearing supply comprising:
an actuator;
a positive displacement element driven by actuator;
a fluid conduit that connects positive displacement element to hydrostatic gas bearing orifices located circumferentially to displacer piston and alternator piston;
a bleed line that connects cold subchamber to positive displacement element; and
an actuator energy source.

78. The engine of claim 49 wherein the alternator piston comprises:
a plunger of cylindrical geometry with axial slots, formed of highly permeable material, and overlaid and with radially-poled permanent magnet tubular rings axially arrayed with adjacent rings of opposite polarity;
a stator, external to plunger, formed of highly permeable laminations that are radially stacked and contain therein electric coils in which electrical voltage is generated by the moving magnets of the alternator piston.

79. The engine of claim 75 wherein the stator includes torque windings to produce piston rotation.

80. A solar-powered Stirling engine comprising:
a solar receiver which converts solar radiation to thermal energy;
a storage chamber for thermal energy in heat transfer communication with the receiver;
a displacer including a displacer chamber and a displacer piston dividing the displacer chamber into separate hot and cold subchambers respectively, the hot subchamber being in heat transfer communication with the storage chamber, the storage chamber and the displacer piston having mating tapered concentric rings to minimize dead volume in the hot subchamber, the displacer chamber and the displacer piston having confronting concentric tapered rings to minimize dead volume in the cold subchamber, the concentric rings on the displacer chamber being hollow, the displacer piston including an internal regenerator and the ends of the displacer piston being porous;
means for flowing a cooling fluid through the hollow rings in the displacer chamber to cool the cold subchamber;
an alternator including an alternator chamber and an alternator piston dividing the alternator chamber into working and bounce subchambers respectively, the working subchamber being in fluid communication with the cold subchamber of the displacer;
a working fluid circulating through the cold subchamber and the working subchamber through the regenerator and in heat transfer communication with the storage chamber, said working fluid being displaced by the displacer piston to drive the alternator piston; and
means for obtaining work output from the alternator piston.

81. The engine of claim 80 wherein the cooling means comprises a conduit for a cooling fluid external to the Stirling engine, and additionally comprising a fan for drawing ambient cooling air over the Stirling engine and the conduit.

82. The engine of claim 81 wherein the cooling fluid is a phase-change fluid.

83. A solar-powered Stirling engine comprising:
- a solar receiver which converts solar radiation to thermal energy;
- a storage chamber for thermal energy in heat transfer communication with the receiver;
- a displacer including a displacer chamber and a displacer piston dividing the displacer chamber into separate hot and cold subchambers respectively, the hot subchamber being in heat transfer communication with the storage chamber, the displacer piston having concentric tapered rings projecting into the cold subchamber;
- a plurality of hollow concentric tapered projections extending into the cold subchamber, said projections being complementary to and meshing with the tapered rings of the displacer piston, said projections including apertures between adjacent projections;
- an alternator including an alternator chamber and an alternator piston dividing the alternator chamber into working and bounce subchambers respectively, the working subchamber being in fluid communication with the cold subchamber of the displacer;
- a working fluid circulating through the cold subchamber and the working subchamber through the apertures between adjacent projections and in heat transfer communication with the storage chamber, said working fluid being displaced by the displacer pistons to drive the alternator pistons; and
- means for obtaining work output from the alternator piston.

84. A solar-powered Stirling engine comprising:
- a solar receiver which converts solar radiation to thermal energy;
- a storage chamber for thermal energy in heat transfer communication with the receiver;
- a displacer including a displacer chamber and a displacer piston dividing the displacer chamber into separate hot and cold subchambers respectively, the hot subchamber being in heat transfer communication with the storage chamber;
- means for cooling the cold subchamber;
- an alternator including an alternator chamber and an alternator piston dividing the alternator chamber into working and bounce subchambers respectively, the alternator piston and portions of the alternator chamber defining the working subchamber including confronting complementary tapered concentric rings which nest together to minimize dead volume, the working subchamber being in fluid communication with the cold subchamber of the displacer;
- a working fluid circulating through the cold subchamber and the working subchamber and in heat transfer communication with the storage chamber, said working fluid being displaced by the displacer piston to drive the alternator piston; and
- means for obtaining work output from the alternator piston.

85. A solar-powered Stirling engine comprising:
- a solar receiver which converts solar radiation to thermal energy;
- a storage chamber for thermal energy in heat transfer communication with the receiver;
- a displacer including a displacer chamber and a displacer piston dividing the displacer chamber into separate hot and cold subchambers respectively, the hot subchamber being in heat transfer communication with the storage chamber;
- means for cooling the cold subchamber;
- an alternator including an alternator chamber and an annular alternator piston having a plurality of magnets dividing the alternator chamber into working and bounce subchambers respectively, the working subchamber being in fluid communication with the cold subchamber of the displacer;
- a working fluid circulating through the cold subchamber and the working subchamber and in heat transfer communication with the storage chamber, said working fluid being displaced by the displacer piston to drive the alternator piston; and
- a stator core within the annular alternator piston with coils in which electrical voltage is generated by the moving magnets of the alternator piston.

86. A solar-powered Stirling engine comprising:
- a solar receiver which converts solar radiation to thermal energy;
- a storage chamber for thermal energy in heat transfer communication with the receiver;
- a displacer including a displacer chamber and a displacer piston dividing the displacer chamber into separate hot and cold subchambers respectively, the hot subchamber being in heat transfer communication with the storage chamber;
- a displacer gas spring on the cold side of the displacer to bis the displacer piston back toward the hot side of the displacer;
- means for cooling the cold subchamber;
- an alternator including an alternator chamber and an alternator piston dividing the alternator chamber into working and bounce subchambers respectively, the working subchamber being in fluid communication with the cold subchamber of the displacer;
- a working fluid circulating through the cold subchamber and the working subchamber and in heat transfer communication with the storage chamber, said working fluid being displaced by the displacer piston to drive the alternator piston; and
- means for obtaining work output from the alternator piston.

87. The engine of claim 86 wherein the volume of the displacer gas spring is variable to alter the stroke of the displacer piston.

* * * * *